(12) United States Patent
O'Neil

(10) Patent No.: US 9,044,006 B1
(45) Date of Patent: Jun. 2, 2015

(54) GAME DECOY LIFT APPARATUS AND METHODS

(75) Inventor: Jeremiah A. O'Neil, Johnstown, PA (US)

(73) Assignee: PRIMOS, INC., Flora, MS (US)

( * ) Notice: Subject to any disclaimer, the term of this patent is extended or adjusted under 35 U.S.C. 154(b) by 302 days.

(21) Appl. No.: 13/533,899

(22) Filed: Jun. 26, 2012

(51) Int. Cl.
*A01M 31/06* (2006.01)

(52) U.S. Cl.
CPC ..................... *A01M 31/06* (2013.01)

(58) Field of Classification Search
CPC ....................................................... A01M 31/06
USPC ............................................................. 43/2, 3
See application file for complete search history.

(56) References Cited

U.S. PATENT DOCUMENTS

| | | | | |
|---|---|---|---|---|
| 378,410 A * | 2/1888 | Trimble | ................................ | 43/3 |
| 740,293 A * | 9/1903 | Loeble | ................................ | 43/3 |
| 1,831,286 A * | 11/1931 | Chelini | ................................ | 43/3 |
| 2,663,108 A * | 12/1953 | Dixon et al. | ......................... | 43/3 |
| 2,691,233 A * | 10/1954 | Richardson | ......................... | 43/3 |
| 2,752,715 A * | 7/1956 | Miller | ................................ | 43/3 |
| 2,787,074 A * | 4/1957 | Miller | ................................ | 43/3 |
| 2,849,823 A * | 9/1958 | Miller | ................................ | 43/3 |
| 2,884,729 A * | 5/1959 | Walton | ................................ | 43/2 |
| 3,346,293 A * | 10/1967 | Wilcox | ......................... | 294/106 |
| 4,965,953 A * | 10/1990 | McKinney | ........................... | 43/2 |
| 5,168,649 A * | 12/1992 | Wright | ................................ | 43/2 |
| 5,459,958 A * | 10/1995 | Reinke | ................................ | 43/2 |
| 5,901,491 A * | 5/1999 | Caldwell | .............................. | 43/2 |
| 6,021,594 A * | 2/2000 | Krueger | .............................. | 43/2 |
| 6,374,529 B1 * | 4/2002 | Petroski et al. | ...................... | 43/3 |
| 6,574,902 B1 * | 6/2003 | Conger | ................................ | 43/2 |
| 6,775,943 B2 * | 8/2004 | Loughman | ........................... | 43/2 |
| 7,225,579 B2 * | 6/2007 | Haley | ................................ | 43/3 |
| 7,231,737 B2 * | 6/2007 | Bradford | .............................. | 43/2 |
| 7,272,906 B1 * | 9/2007 | Spaulding, Sr. | ...................... | 43/3 |
| 7,562,487 B2 * | 7/2009 | Barr | ................................ | 43/2 |
| 7,703,233 B2 * | 4/2010 | Zink et al. | ............................ | 43/3 |
| 7,908,785 B2 * | 3/2011 | Allen et al. | ........................... | 43/3 |
| 8,082,690 B2 * | 12/2011 | Zink, Jr. | .............................. | 43/3 |
| 8,230,638 B1 * | 7/2012 | Dunaway | ............................ | 43/2 |
| 8,291,634 B2 * | 10/2012 | White | ................................ | 43/2 |
| 8,387,301 B2 * | 3/2013 | Williams, Sr. | ....................... | 43/2 |
| 8,769,860 B2 * | 7/2014 | Bain | ................................ | 43/2 |
| 8,925,240 B2 * | 1/2015 | Beal | ................................ | 43/2 |
| 2003/0208944 A1 * | 11/2003 | Olson et al. | ......................... | 43/3 |
| 2005/0132632 A1 * | 6/2005 | Fisher | ................................ | 43/3 |
| 2010/0064569 A1 * | 3/2010 | Wyant | ................................ | 43/2 |
| 2011/0023349 A1 * | 2/2011 | Hughes | ................................ | 43/3 |

* cited by examiner

*Primary Examiner* — Darren W Ark

(74) *Attorney, Agent, or Firm* — Holland & Hart

(57) ABSTRACT

A game decoy component includes a support member, an anchor, a bearing member, a carrier member, and a flexible member. The support member includes distal and proximal ends. The anchor is connected to the proximal end of the support member. The bearing member is positioned at the distal end of the support member. The carrier member is slidably supported on the support member and configured for attachment to a portion of a game decoy. The flexible member has a first end connected to the carrier member and an opposing second end positioned remote from the carrier member. The flexible member is supported on the bearing member. Applying tension in the flexible member moves the carrier member along the support member to move the portion of the game decoy relative to the support member.

11 Claims, 11 Drawing Sheets

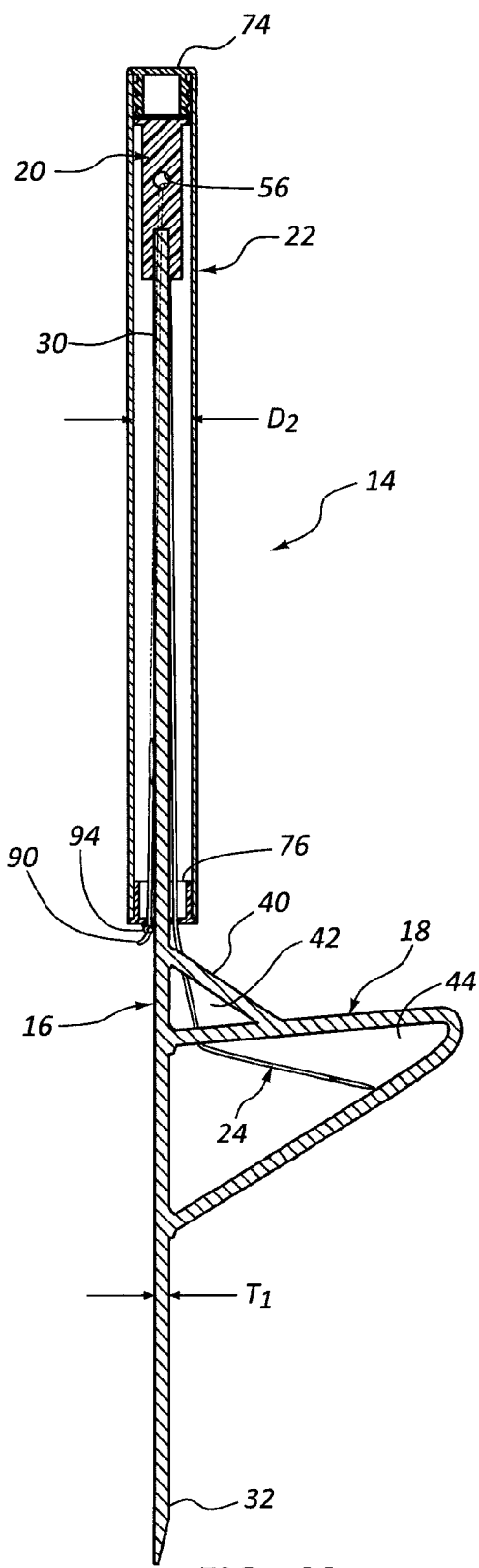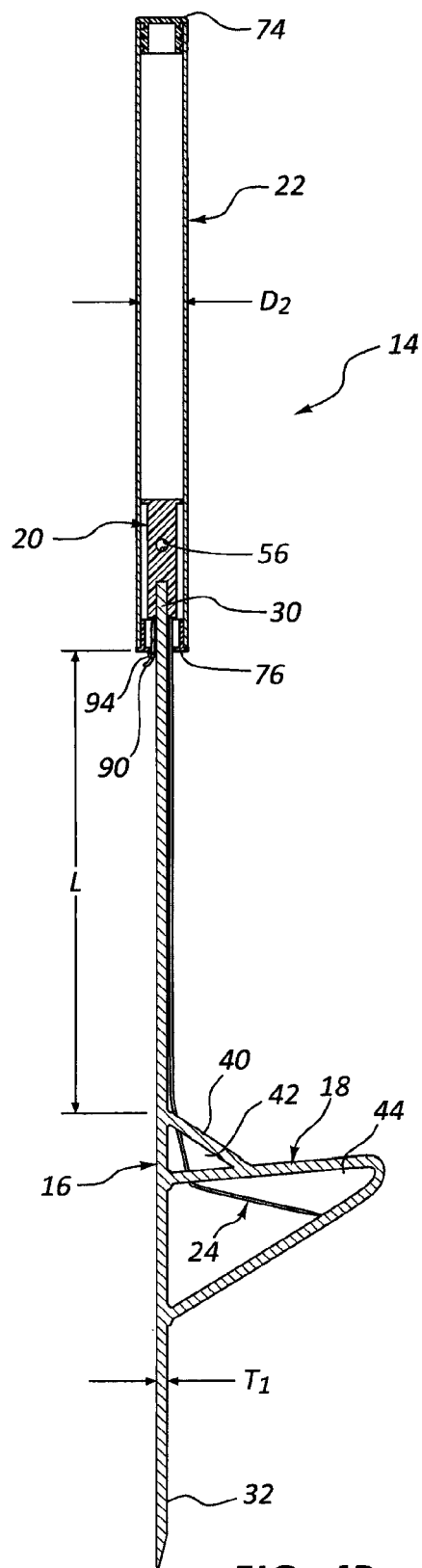
*FIG. 4A*  *FIG. 4B*

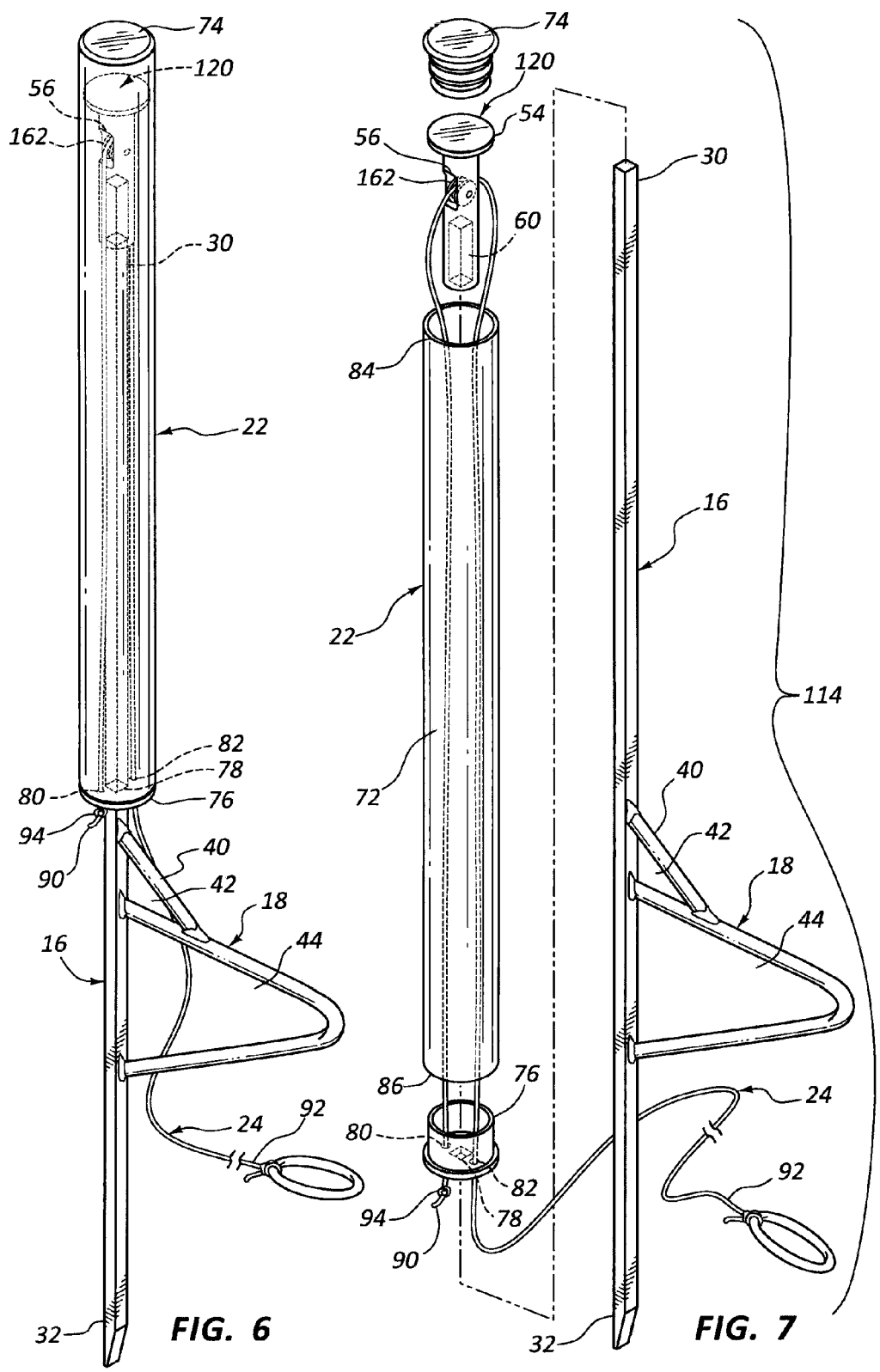

GAME DECOY LIFT APPARATUS AND METHODS

BACKGROUND

A variety of decoys have been used to lure game animals into range for effective hunting, harvest, and/or observation and study. Making the decoy appear life-like tends to more successfully attract game animals to the decoy. In addition to constructing the decoy to look like the game animals, efforts have been made to make decoy move like the game animals. Many types of wildlife animals can recognize when a decoy has remained completely stationary for an unnatural amount of time, especially if it is apparent that the decoy is not simulating a sleeping position. When wildlife animals recognize that a decoy is not real, the wildlife animals will typically move away from the decoy and will not respond to game calls or other attempts by the outdoorsman to lure the wildlife animals closer to the decoy.

Movable decoys are often highly mechanized. A highly mechanized decoy typically has many drawbacks including, for example, increased weight, reduced durability, greater difficulty to repair and maintain, and higher cost. While there may be some advantages to existing movable decoys, these common drawbacks tend to deter many outdoorsmen from using such decoys.

Opportunities exist for improvements in moveable decoys that address the above noted drawbacks of existing movable decoys.

SUMMARY

According to certain embodiments, a game decoy component includes a support member, an anchor, a bearing member, a carrier member, and a flexible member. The support member includes distal and proximal ends. The anchor is connected to the proximal end of the support member. The bearing member is positioned at the distal end of the support member. The carrier member is slidably supported on the support member and configured for attachment to a portion of a game decoy. The flexible member has a first end connected to the carrier member and an opposing second end positioned remote from the carrier member. The flexible member is supported on the bearing member. Applying tension in the flexible member moves the carrier member along the support member to move the portion of the game decoy relative to the support member.

The flexible member may include one of an inelastic cord and an elastic cord. The bearing member may include a bearing surface defined by a bore in the bearing member, wherein the bearing surface supports the flexible member. The bearing surface may include a pulley. The bearing surface may include a low friction polymeric material. The carrier member may include first and second end portions, wherein the first end portion is closed and the second end portion includes a first opening through which the support member extends and a second opening through which the second end of the flexible member extends.

The carrier member may include a hollow housing, wherein the distal end of the support member and the bearing member are positioned in the housing, and applying tension in the flexible member moves the housing axially relative to the support member. The carrier member may include a distal plug positioned in a distal end of the housing and a proximal plug positioned in a proximal end of the housing, wherein the support member and the flexible member extend through the proximal plug.

According to another embodiment, a game decoy includes a decoy body and a movement assembly. The movement assembly includes a support member having distal and proximal ends, a bearing member connected to the support member and having a bearing surface, a carrier member connected to the decoy body, and a cord having a first end connected to the carrier member and a second end supported on the bearing surface and extending out of the carrier member. Applying tension at the second end of the cord moves the carrier member along the support member to move the decoy body.

The support member may be arranged vertically and the carrier member moves vertically upward upon application of the tension force. The carrier member may automatically move vertically downward upon release of the tension force. The bearing member may include a lateral bore that defines the bearing surface. The bearing member may be positioned at a distal end of the support member, and a proximal end of the support member is insertable into a ground surface to anchor the game decoy. The carrier member may include a first bore through which the support member extends, and second and third bores through which opposing ends of the cord extend. The movement assembly may include tubular housing having a cavity within which the bearing member and carrier member are retained, and applying tension in the cord moves the housing relative to the support member.

A further embodiment relates to a method of operating a game decoy. The method includes providing a body and a movement assembly comprising a support member, a bearing member connected to the support member and having a bearing surface, a carrier member, and a cord having first and second ends. The first end is connected to the carrier member, the second end extends out of the carrier member. The cord is supported on the bearing member and the carrier member is connected to a portion of the body. The method also includes applying tension at the second end of the cord to move the carrier member along the support member toward the bearing member, wherein moving the carrier member moves the body relative to the support member.

The method may include releasing the tension and automatically moving the carrier member away from the bearing member under a weight force of the body. The method may include providing a housing, wherein the carrier member is fixed in the housing and the bearing member is movable in the housing. Applying tension at the second end of the cord may draw the cord out of the carrier member. The bearing member may include a low friction material.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are part of the specification. Together with the following description these drawings demonstrate and explain various principles of the instant disclosure.

FIGS. 4A and 4B are cross-sectional views of the lift assembly of FIG. 3 in lowered and raised positions, respectively.

FIG. 6 is a perspective view of another example lift assembly in accordance with the present disclosure.

FIG. 7 is an exploded perspective view of the lift assembly of FIG. 6.

DETAILED DESCRIPTION

Figure 1:
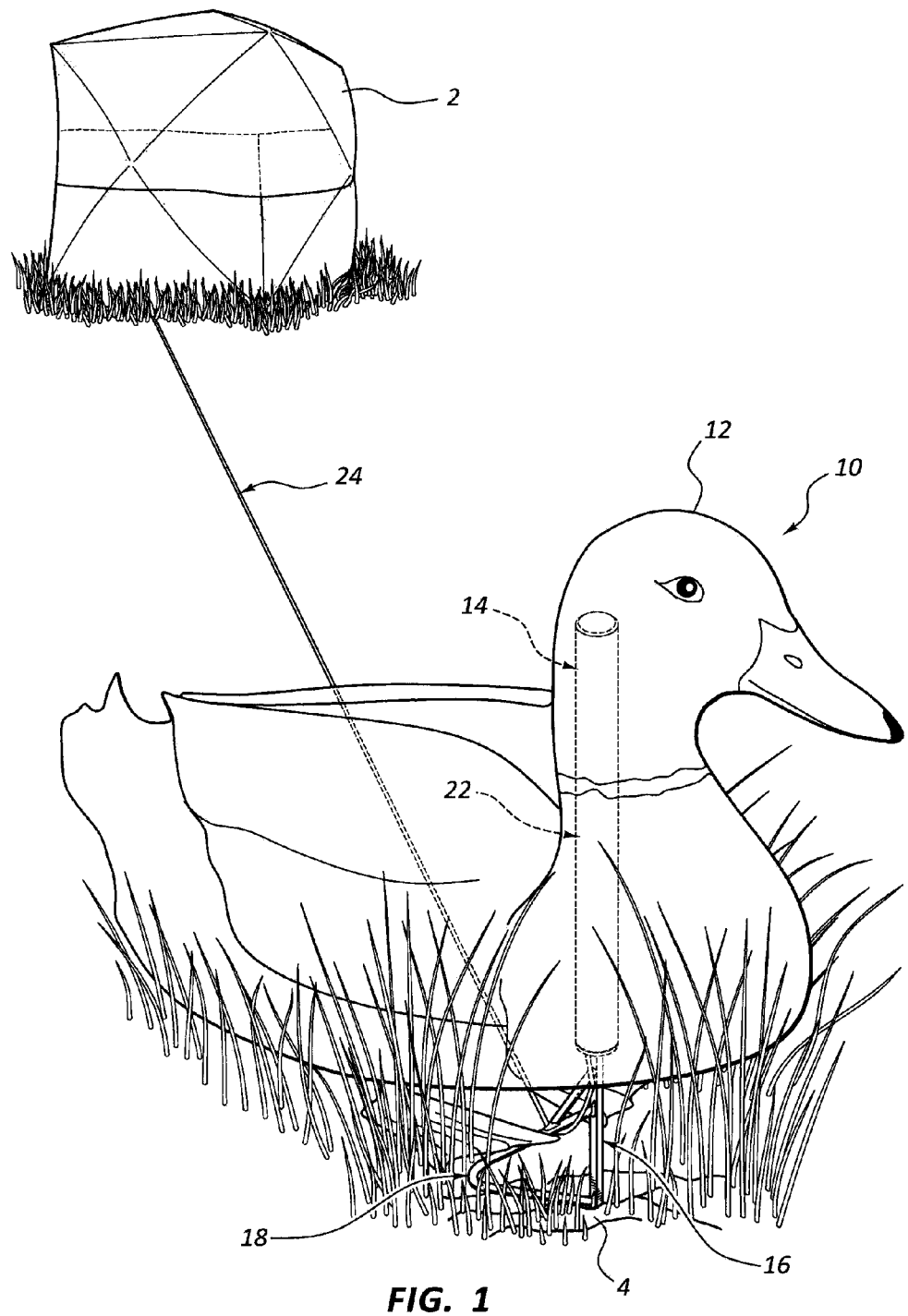
FIG. 1 is a perspective view of an example game decoy in a lowered position in accordance with the present disclosure.

Throughout the drawings, identical reference characters and descriptions indicate similar, but not necessarily identical, elements. While embodiments of the instant disclosure are susceptible to various modifications and alternative forms, specific embodiments have been shown by way of example in the drawings and will be described in detail herein. However, one of skill in the art will understand that embodiments of the instant disclosure are not intended to be limited to the particular forms disclosed herein. Rather, the instant disclosure covers all modifications, equivalents, and alternatives falling within the scope of embodiments defined by the appended claims.

The wild animal decoys and related movable components of such decoys illustrated and described herein may provide various advantages. For example, according to some embodiments, a game decoy may include movable portions that provide a more realistic appearance. In certain embodiments, a game decoy may include a lift member that raises and lowers portions of the decoy to give the appearance that the decoy is moving. The movable portions of a game decoy discussed herein may also provide various other features and advantages.

One aspect of the present disclosure is directed to a game decoy that includes a decoy body having the appearance of a wildlife and a lift assembly used to move at least portions of the decoy body. The decoy body may have the appearance of a wildlife, such as a fowl (e.g., duck, goose, pheasant or wild turkey), a rodent or a small animal (e.g., squirrel or rabbit), or large game (e.g., wild boar, deer or elk). The lift apparatus may be configured to move the entire decoy body (e.g., raising and lowering the entire decoy body). Alternatively, the lift apparatus may operate to move portions of the decoy body (e.g., move a wing, leg, head or tail of the decoy body).

The lift apparatus may have a relatively simply construction with a minimum number of moving parts. In one example, the lift assembly includes a support member and an anchor connected at one end of the support member for securing the support member to a support surface such as, for example, a ground surface or portion of a decoy body. A bearing member is connected to an opposite end of the support member from the anchor. A carrier member may be secured to the decoy body or portion of the decoy body that is to be moved. One end of a cord is secured to the carrier member. The cord passes through the bearing member and a second end thereof exits the carrier member for actuation by an operator. Applying tension in the cord at its second end causes the carrier member to move axially along the support member. The cord slides along a bearing surface of the bearing member upon application of the tension force at the second end of the cord.

In one example, the carrier member has a tubular shape with a distal end that is closed and a proximal end that includes at least one opening. The support member extends through the opening at the proximal end of the carrier member. A first end of the cord is secured to the carrier member at a proximal end of the carrier member. A second end of the cord passes through an aperture formed in the bearing member and extends out of the carrier member at an opening at the proximal end for access by the operator. The bearing member is mounted to a distal end of the support member and positioned within the tubular shaped carrier member.

In one arrangement, the support member is oriented vertically and applying tension force at the second end of the cord moves the carrier member vertically upward relative to the support member to move at least a portion of the decoy body vertically. Releasing tension in the cord causes the carrier member to return downward to its original position. The weight of the carrier member and portion of the decoy body that is lifted by the lift assembly may cause the carrier member to automatically move back to the original rest position upon releasing tension in the cord. In other arrangements, a biasing member such as, for example, a spring may be interposed between the bearing member and a proximal end of the carrier member to bias the carrier member back to its original rest position upon releasing tension in the cord.

Figure 2:
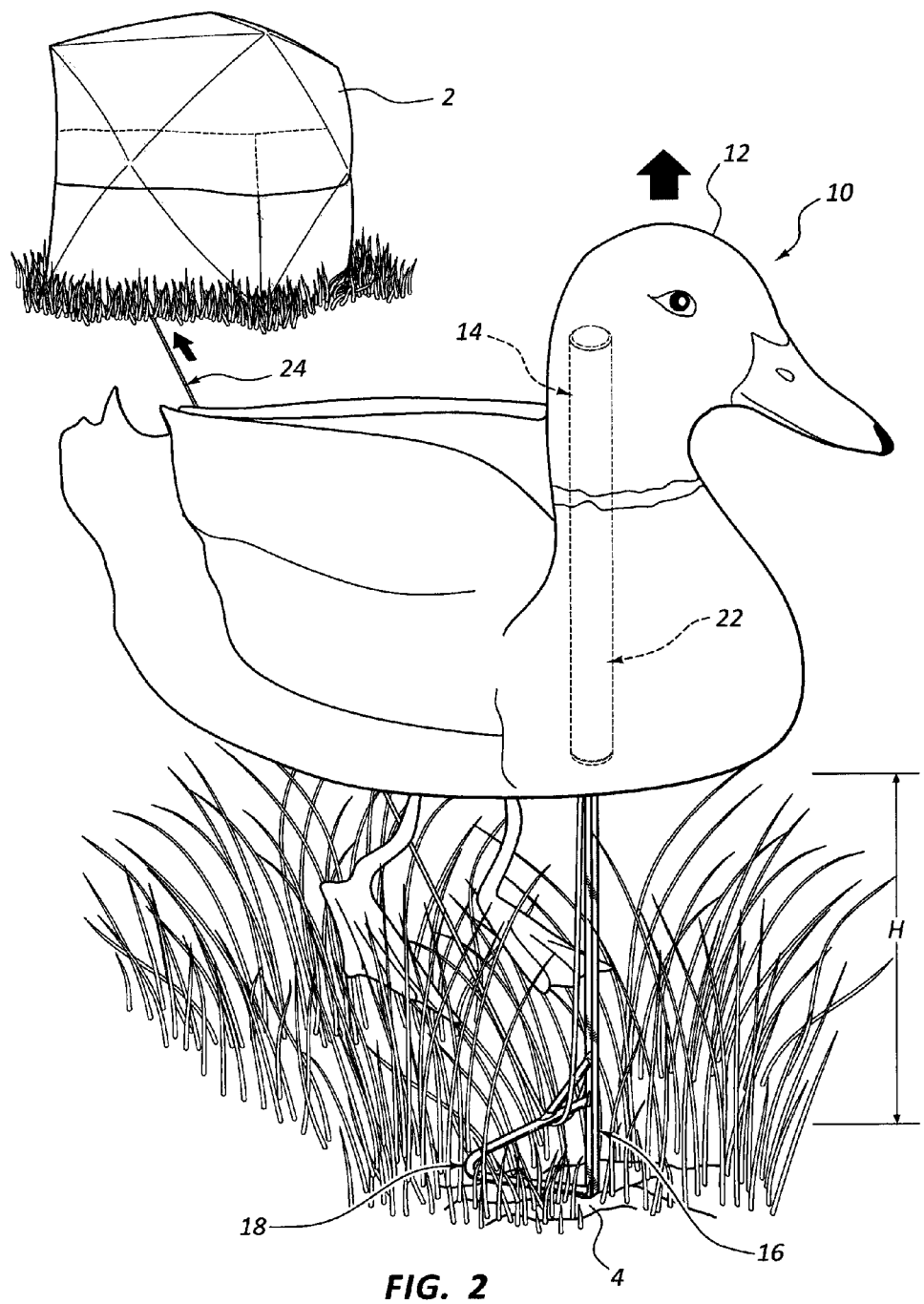
FIG. 2 is a perspective view of the game decoy of FIG. 1 in a raised position.

Referring now to FIGS. 1 and 2, an example game decoy 10 is shown including a decoy body 12 and a lift assembly 14. The lift assembly 14 includes a support member 16, an anchor 18, a carrier member 22, and a cord 24. The cord 24 may extend to a remote location such as a hunting blind 2. An operator (e.g., outdoorsman) may actuate the lift assembly 14 from the hunting blind 2. The lift assembly 14 may be actuated by applying tension in the cord 24, which causes the lift assembly 14 to raise vertically, thereby lifting the decoy body 12 as shown in FIG. 2. The decoy body 12 may rise to a height H relative to a lowered or rest position shown in FIG. 1. The cord 24 may extend through a portion of the anchor 18 to direct the cord 24 along a ground surface 4 that supports the support member 16. Other features may be used in place of the anchor 18 to direct the cord 24 along the ground surface 4.

The operator may pull and release the cord 24 different amounts and according to various sequences to move the game decoy 10 up and down as desired. The up and down movement of the game decoy 10 may stimulate standing, sitting or laying positions for the game represented by the decoy body 12.

Other orientations are possible for the lift assembly 14 to provide movement of the decoy body 12 in different directions. For example, the lift assembly 14 may be arranged at a non-vertical angle such as, for example, an angle of about 45 degrees relative to the generally horizontal ground surface 4. In other arrangements, the lift assembly 14 may be oriented in a generally horizontal plane, wherein actuation the lift assembly moves the decoy body 12 or portions of the decoy body 12 in a horizontal direction or any non-vertical direction.

Figure 3:
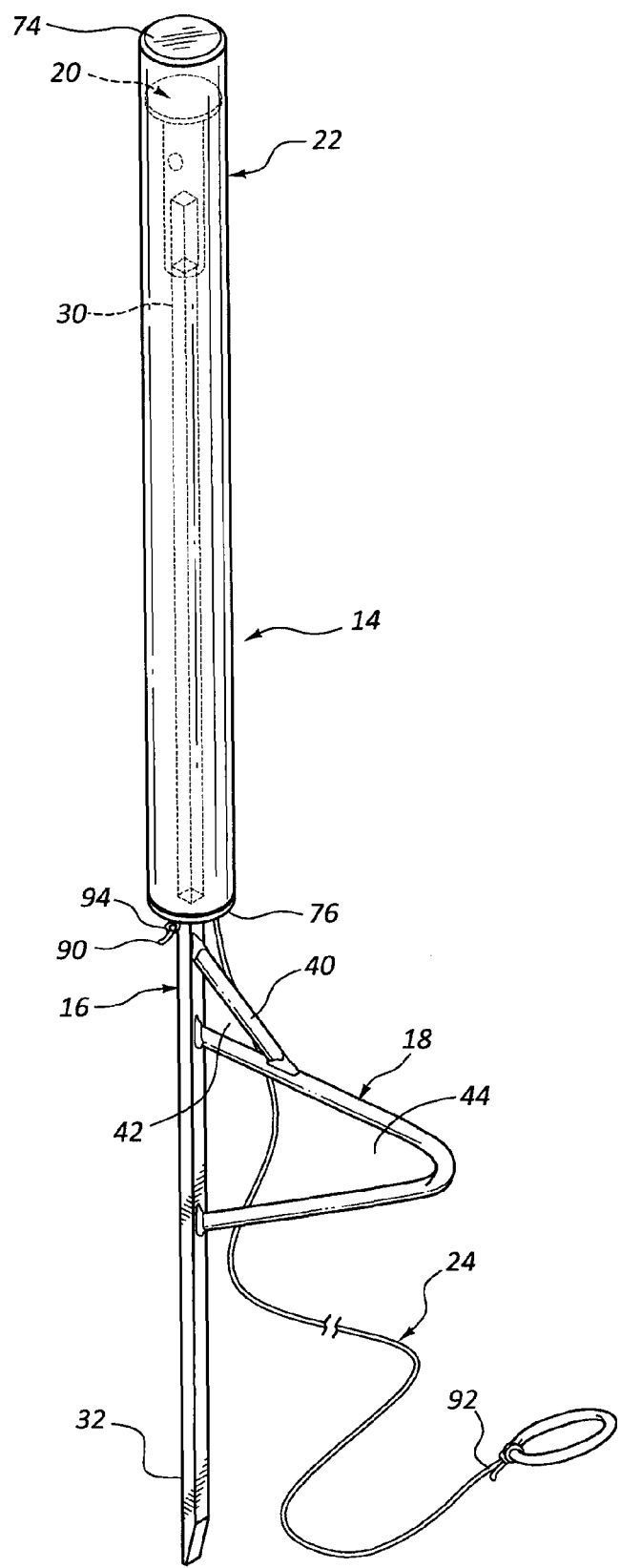
FIG. 3 is a perspective view of a lift assembly of the game decoy of FIG. 1.
Figure 5:
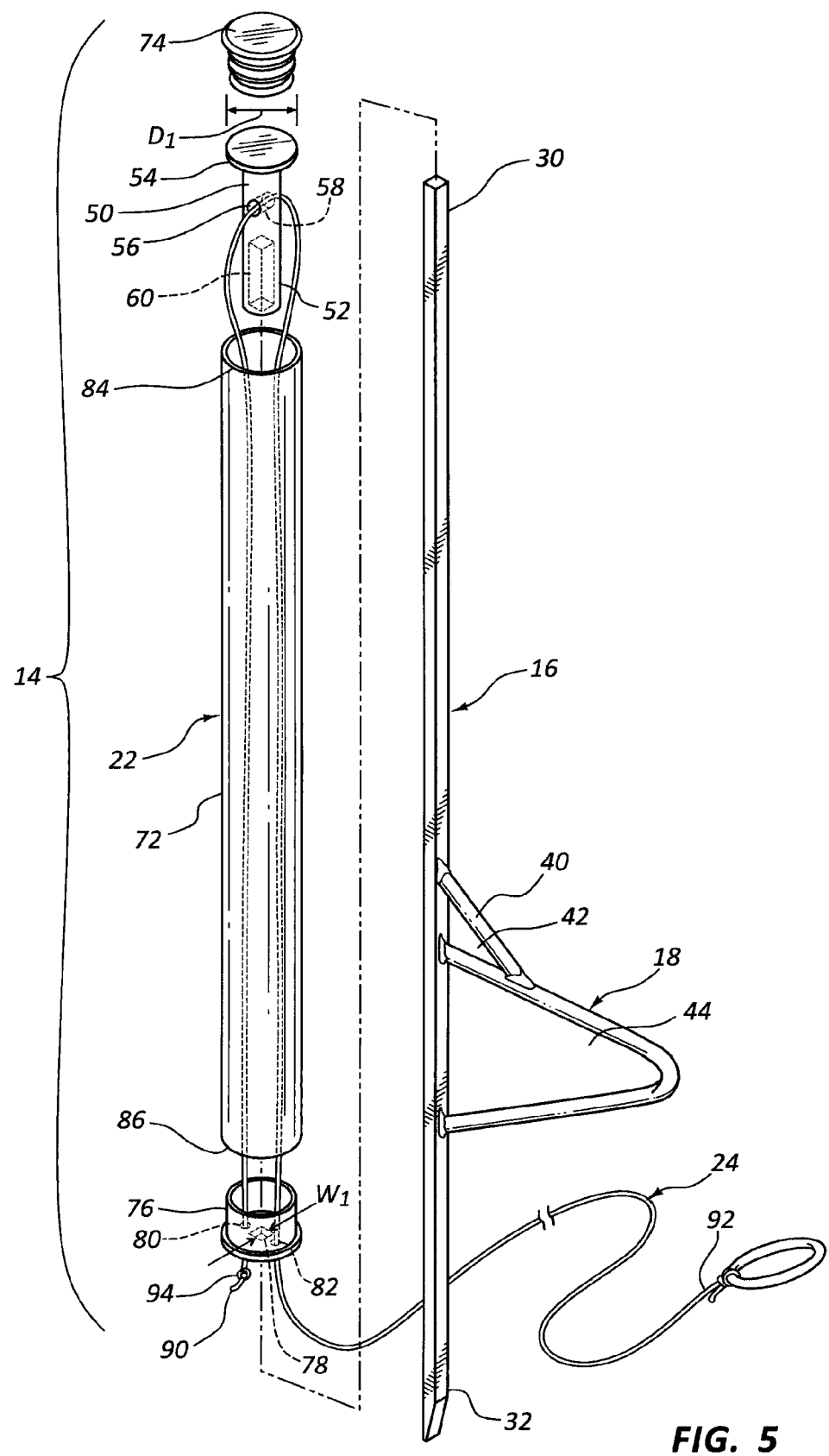
FIG. 5 is an exploded perspective view of the lift assembly of FIG. 3.

Referring now to FIGS. 3-5, the lift assembly 14 is shown in further detail. The lift assembly 14 includes a support member 16, an anchor 18, a bearing member 20, a carrier member 22, and a cord 24. The anchor 18 is positioned at a location along the length of the support member 16. The bearing member 20 is supported at one end of the support member 16 and positioned within the carrier member 22. One end of the cord 24 is secured at a proximal end of the carrier member 22 and an opposite end of the cord extends through the bearing member 20 and out of the carrier member 22 at its proximal end. Pulling on the cord 24 (e.g., applying a tension force at a second end of the cord 24) moves the carrier member 22 axially relative to the support member 16 and bearing member 20 between the lowered or rest position of FIG. 4A and the raised or extended position of FIG. 4B.

The support member 16 includes distal and proximal ends 30, 32. The anchor 18 includes an anchor support 40 and first and second cord openings 42, 44. The bearing member 20 includes distal and proximal ends 50, 52, a carrier interface portion 54, a bearing aperture 56 having a bearing surface 58, and a support member bore 60 (see FIG. 5). The carrier member 22 includes a tube portion 72, distal and proximal plugs 74, 76, distal and proximal ends 84, 86, a first aperture 78 formed in the proximal plug 76, and first and second cord apertures 80, 82 formed in proximal plug 76. The cord 24 includes first and second ends 90, 92 and a knot 94 formed at the first end 90.

The distal end 30 of the support member 16 may extend into the support member bore 60 of the bearing member 20. The proximal end 32 of support member 16 may have a tapered shape or other feature that promotes easier insertion of the support member 16 into a support surface such as a ground surface. A maximum length or distance that the carrier member 22 moves relative to support member 16 is labeled as length L between the bearing member 20 and the anchor support 40 (see FIG. 4B).

The anchor 18 may provide structure against which the operator applies a force to insert the support member 16 into a support surface such as a ground surface. The anchor support 40 may provide additional connection of the anchor 18 to the support member 16.

The first and second cord openings 42, 44 may be sized and arranged for the cord 24 to pass through as shown in FIGS. 1 and 2. Directing the cord 24 through one of the first and second cord openings 42, 44 may help direct the second end 92 of cord 24 along the support surface (e.g., a ground surface) so that the cord 24 is better concealed during operation. Directing the cord 24 through one of the first and second cord openings 42, 44 may help maintain alignment of the cord 24 axially (e.g., straight out of) the carrier member 22 when operating the lift assembly 14. Other structures may be added to the lift assembly 14 that help manage the cord 24 and direct the second end 92 of cord 24 during use.

The carrier interface portion 54 of the bearing member 20 is positioned at the distal end 50. The carrier interface portion 54 may have a diameter $D_1$ (see FIG. 5) that is substantially similar in size to an inner diameter $D_2$ of the tube portion 72 of carrier member 22 (see FIG. 4A). A difference in size between the diameters $D_1$ and $D_2$ and a different in size between a thickness $T_1$ of the support member 16 (see FIG. 4A) and a maximum width $W_1$ of the first aperture 78 in the proximal plug 76 may control at least in part how much lateral movement (e.g., play or tolerance) is possible between the carrier member 22 and the assembly of the support member 16 and bearing member 20 during operation. In at least some arrangements, the bearing member 20 comprises a low friction material such as, for example, nylon, that provides limited friction between the bearing member 20 and the inner surface of tube portion 72 during axial movement of the carrier member 22 relative to support member 16.

The bearing aperture 56 may be arranged generally perpendicular to a longitudinal axis of the support member 16. The bearing aperture 56 may be a through bore that extends laterally through the bearing member 20. The bearing aperture 56 may define a bearing surface 58 that supports the cord 24 and over which the cord 24 moves with sliding contact during operation of lift assembly 14. Any suitable material known to those skilled in the art may be used for bearing member 20 to provide a limited friction interface between the cord 24 and the bearing surface 58.

The bearing aperture 56 may have features formed therein that help reduce friction as the cord 24 moves through the bearing aperture 56. For example, the edges of the bearing aperture 56 at its entrance and exit may be tapered, rounded or chamfered. The bearing aperture 56 may have a contoured or curved shape along its length. Cord 24 may be made of any suitable material known to those skilled in the art to provide reduced friction.

The distal plug 74 of carrier member 22 may be inserted into an open end of tube portion 72 at the distal end 84. The proximal plug 76 may be inserted into a proximal open end of tube portion 72 at proximal end 86. The distal plug 74 may be supported against the carrier interface portion 54 at the distal end 50 of bearing member 20 when the carrier member 22 is in a lowered or rest position, as shown in FIG. 4A. The distal plug 74 may act as a stop surface within the carrier member 22 to limit axial movement of carrier member 22 relative to the support member 16 in an advancing or distal direction.

The proximal plug 76 may contact the proximal end 52 of bearing member 20 when the carrier member 22 is in a raised position as shown in FIG. 4B. The proximal plug 76 may act as a position stop that limits axial movement of the carrier member 22 in a retracting or proximal direction relative to the support member 16 during use.

The first aperture 78 may have a size and shape that substantially matches a size and shape of an outer profile of support member 16. For example, FIG. 5 shows the first aperture 78 having a square shape that matches the generally square cross-sectional shape of support member 16. The matching shape of the first aperture 78 with the cross-sectional shape of support member 16 may restrict or limit rotation of the carrier member 22 relative to the support member 16. Other shapes and sizes are possible for the first aperture 78 and cross-sectional shape of the support member 16 that provide different amounts of relative rotational movement between the support member 16 and carrier member 22 (e.g., see circular-shaped cross-section of support member 16 in FIG. 9).

The first and second cord apertures 80, 82 may be sized to have a portion of the cord 24 pass therethrough. In one example, the first end 90 of cord 24 extends through the first cord aperture 80. A knot 94, tied at the first end 90, may limit removal of the first end 90 back through the first cord aperture 82 and into an interior of the tube portion 72. The first end 90 may be secured to the carrier member 22 at other locations such as, for example, a sidewall of the tube portion 72 adjacent to the proximal end 86. Other structures or methods may be used to secure the first end 90 to the carrier member 22, such as, for example, a clips, brackets, adhesives, or sleeves that are positioned inside or outside of the tube portion 72. Further, either of the first and second cord apertures 80, 82 may be formed at other locations beside in the proximal plug 76 such as, for example, in a sidewall of the tube portion 72. Forming the first and second cord apertures 80, 82 in the plug 76, which is removable from tube portion 72, may improve ease of assembling lift assembly 14.

The cord 24 may extend from the proximal plug 76, through the bearing aperture 56, and out through the second cord aperture 82. With this arrangement, applying tension in the cord 24 at the second end 92 applies an axial directed force at the proximal plug 76 that moves the tube portion 72 axially along the support member 16 until the proximal plug 76 contacts the bearing member 20 (see FIG. 4B). In at least some examples, the weight of the carrier member 22 and the relatively low-friction interface between cord 24 and the bearing surface 58 permits the carrier member 22 to automatically move in an opposite direction (e.g., vertically downward) upon release of the tension force in cord 24. In other examples, when the carrier member 22 is attached to a decoy body or portion of the decoy body, the weight of the decoy body or a portion thereof may assist in moving the carrier member 22 from the raised or extended position of FIG. 4B to the lowered or rest position of FIG. 4A.

Figure 8A:
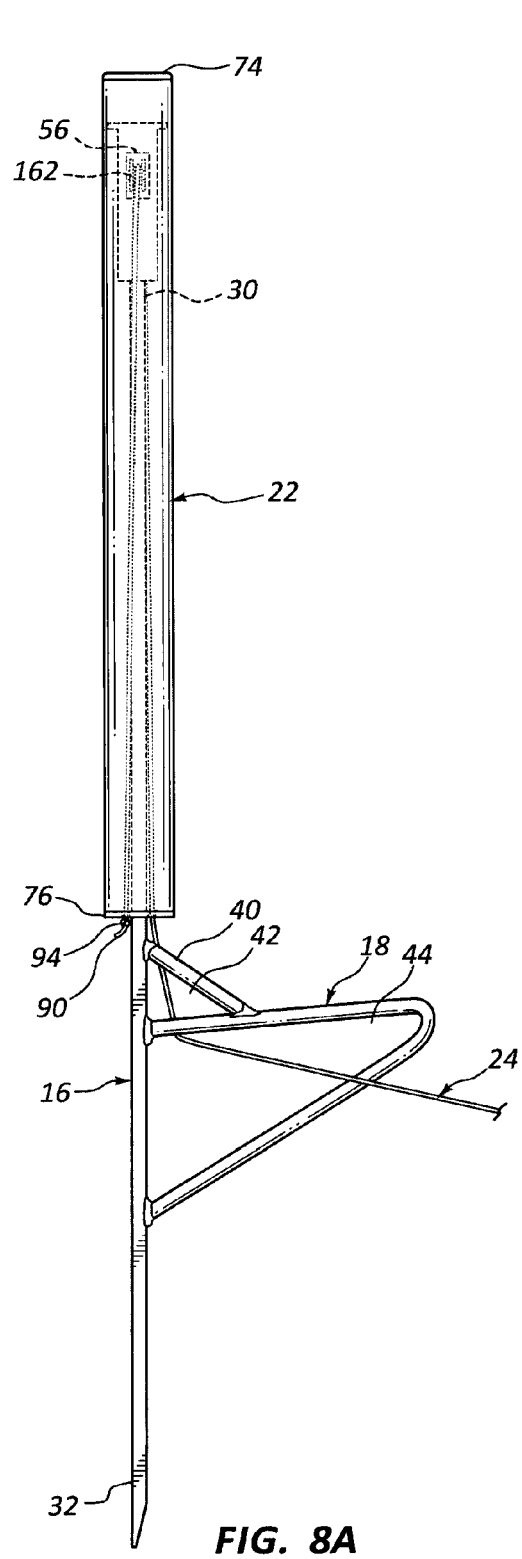
FIGS. 8A and 8B are side views of the lift assembly of FIG. 6 in lowered and raised positions, respectively.
Figure 8B:
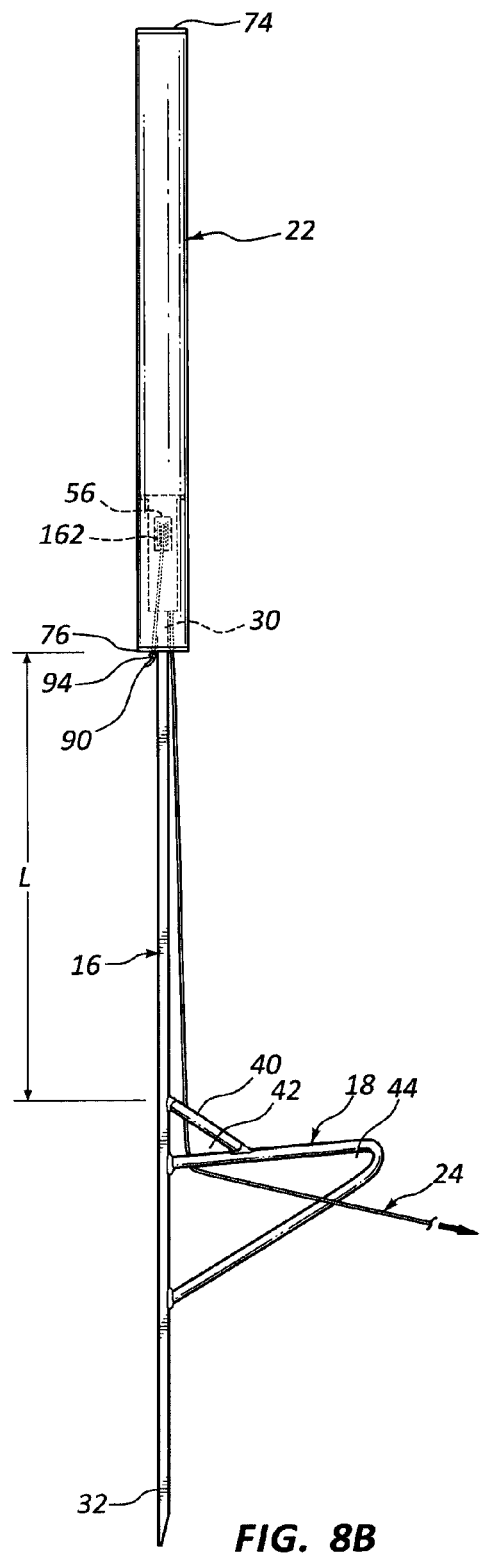

Referring now to FIGS. 6-8B, another example lift assembly 114 is shown including a support member 16, an anchor 18, a bearing member 120, a carrier member 22, and a cord 24. The support member 16, anchor 18, carrier member 22, and cord 24 may be substantially the same as shown and described with reference to the embodiment of FIGS. 3-5. The bearing member 120 may include a pulley 162 positioned within the bearing aperture 56. The cord 24 may extend over the pulley 162. The pulley 162 may provide a reduced friction interface between the cord 24 and the bearing member 20. In at least some arrangements, the pulley 162 may provide a lower friction interface between the cord 24 and the bearing member 20 than the bearing surface 58 described above with reference to bearing member 20. FIG. 8A shows the lift assembly 114 in a lowered or rest position. FIG. 8B shows the lift assembly 114 in a raised or extended position at a height H.

Figure 9:
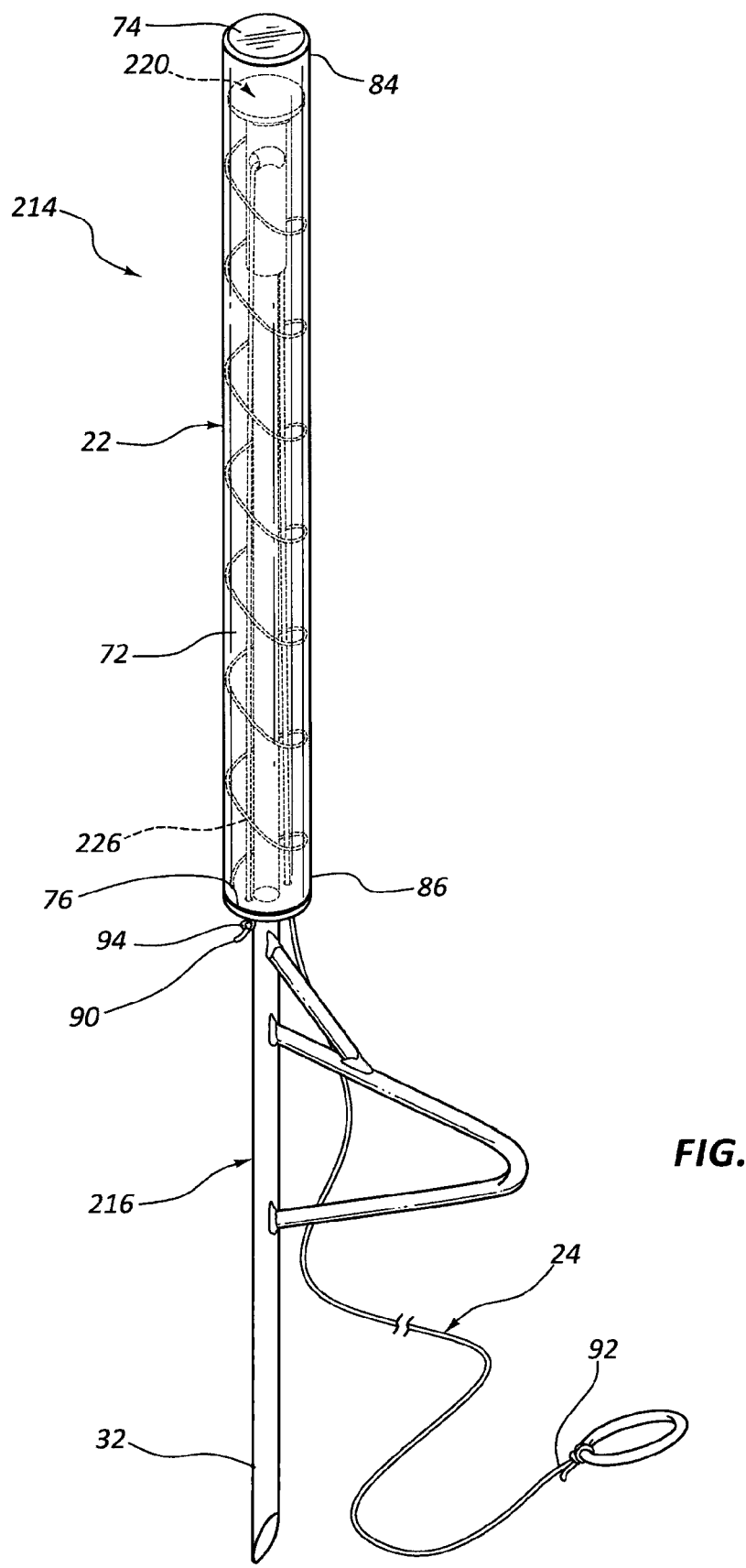
FIG. 9 is a perspective view of another example lift assembly in accordance with the present disclosure.
Figure 10A:
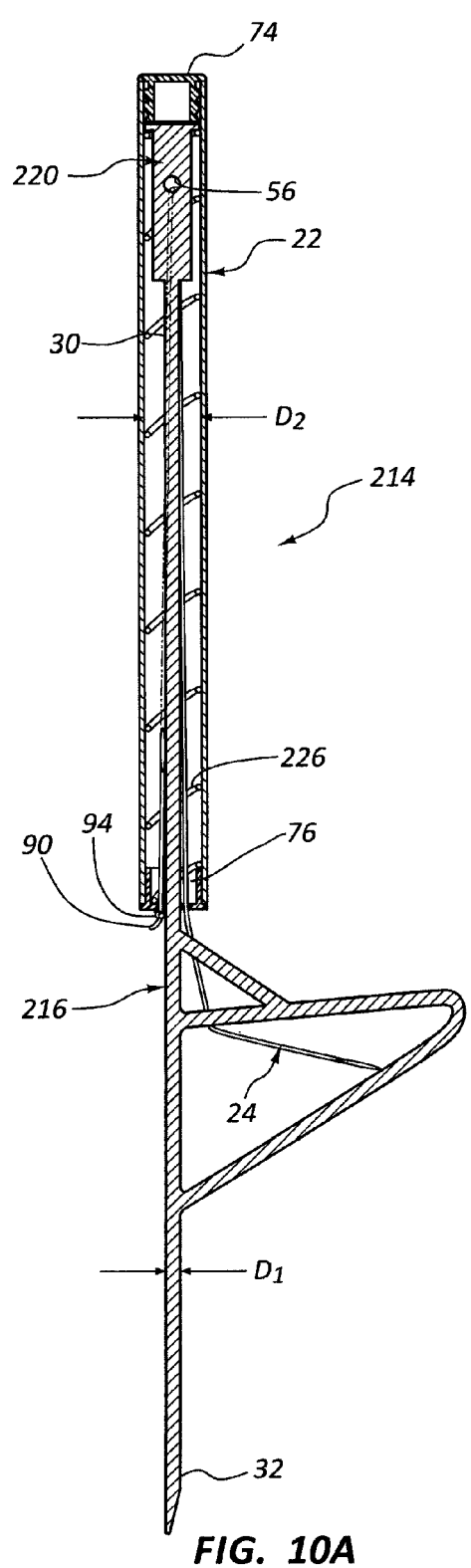
FIGS. 10A and 10B are cross-sectional views of the lift assembly of FIG. 9 in lowered and raised positions, respectively.
Figure 10B:
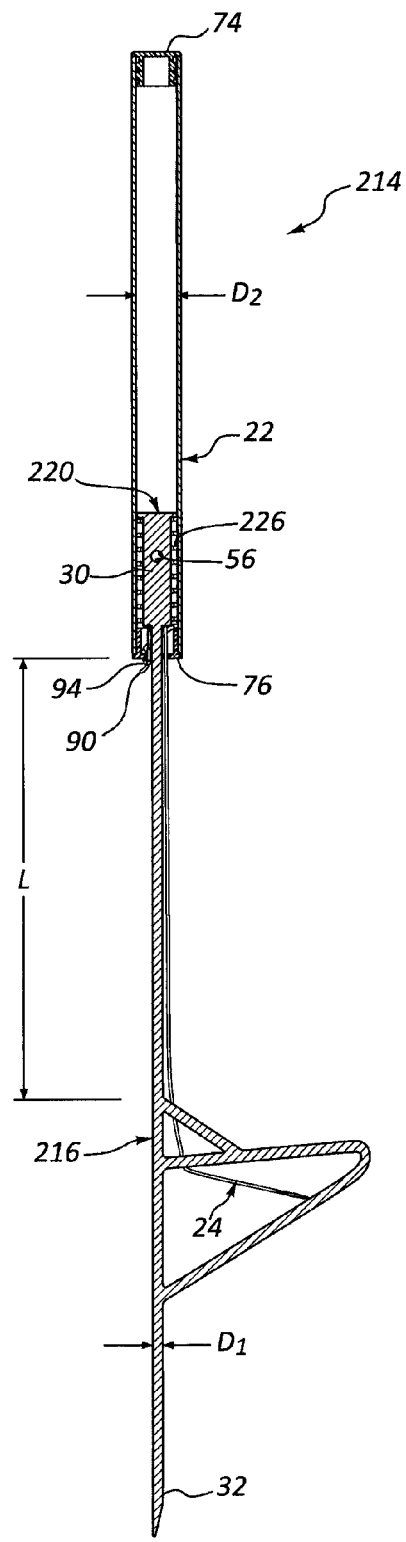

Referring to FIGS. 9-10B, another example lift assembly 214 includes a support member 216, an anchor 18, a bearing member 220, a carrier member 22, and a cord 24. Lift assembly 214 may also include a spring 226. The support member 216 and bearing member 220 may be formed as a single, unitary piece as shown in FIGS. 10A and 10B. The support member 216 and bearing member 220 may be formed as separate pieces that are permanently connected together. The bearing aperture 56 may extend through the support member 216 instead of the bearing member 220. The bearing surface 58 may be defined by the bearing aperture 56. Alternatively, the pulley 162 of lift assembly 114 or some other low friction device or material may be positioned within bearing aperture 56.

Portions of the support member 216 and bearing member 220 may be coated with or formed of a low-friction material, while other portions of the support member 216 and bearing member 220 may comprise a higher-friction material that has different properties such as, for example, higher strength. In at least one example, the support member 216 comprises a high-strength material such as steel or other metal material and portions of the bearing member 220 comprise a polymeric material or a coating comprising polymeric material.

The spring 226 may be positioned within the tube portion 72 between the proximal plug 76 and features of the bearing member 220 such as, for example, the carrier interface portion 54. The spring 226 may be compressed when extending the carrier member 22 relative to the support member 216 as shown in FIG. 10B. The spring 226 applies a biasing force that moves the carrier member 22 from the raised or extended position of FIG. 10B back to the lowered or rest position of FIG. 10A automatically upon releasing tension in the cord 24. The spring 226 may dampen movements of the carrier member 22 relative to the support member 16 to provide a smoother, natural appearing movement for the decoy body attached to the carrier member 22.

Figure 11:
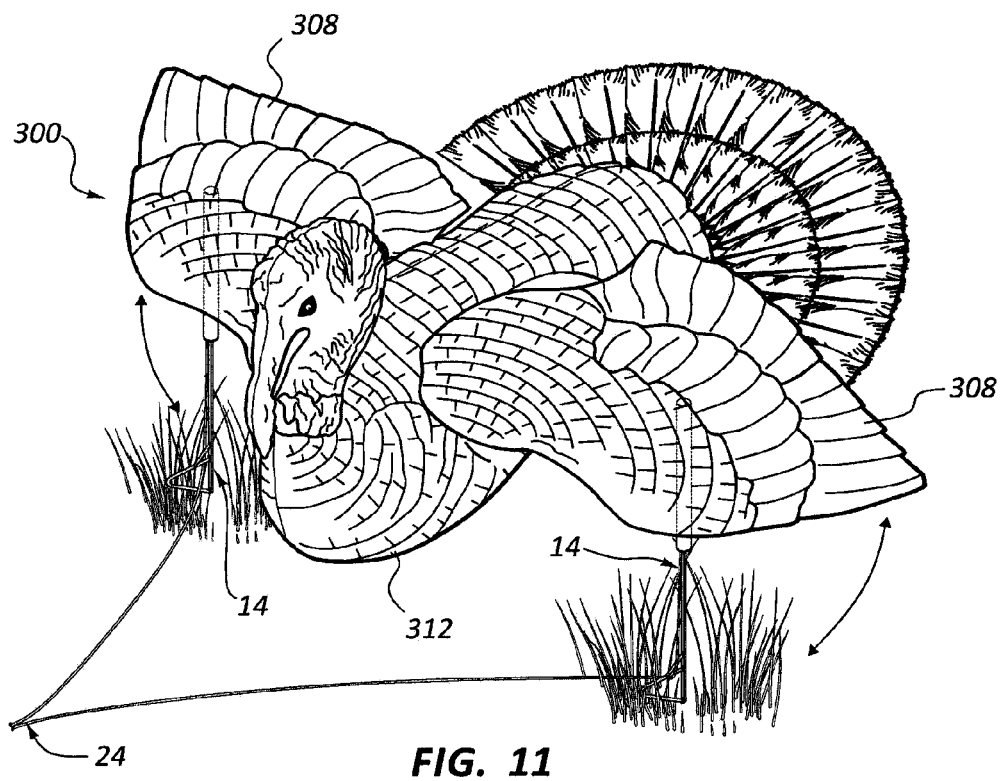
FIG. 11 shows another example game decoy operable using a pair of the lift assemblies of FIG. 3 in accordance with the present disclosure.
Figure 12:
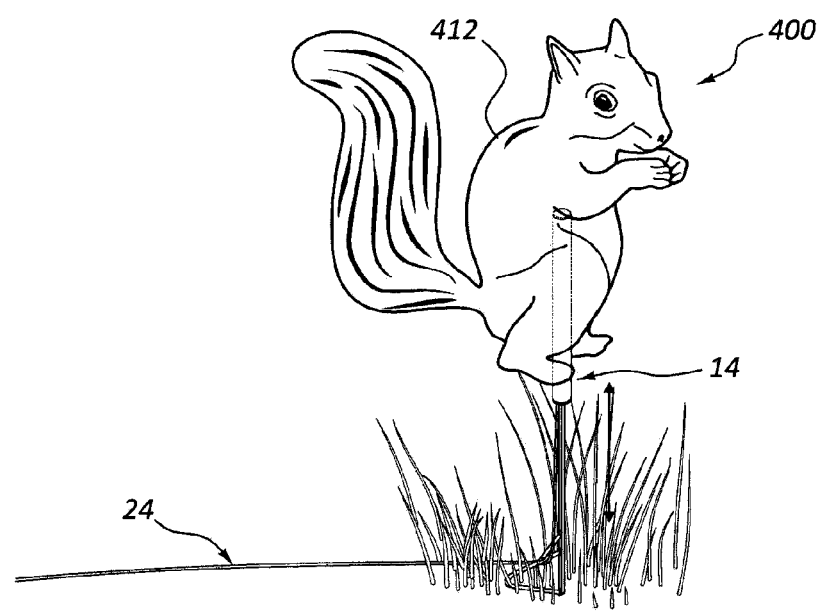
FIG. 12 shows another example game decoy using the lift assembly of FIG. 3 in accordance with the present disclosure.
Figure 13:
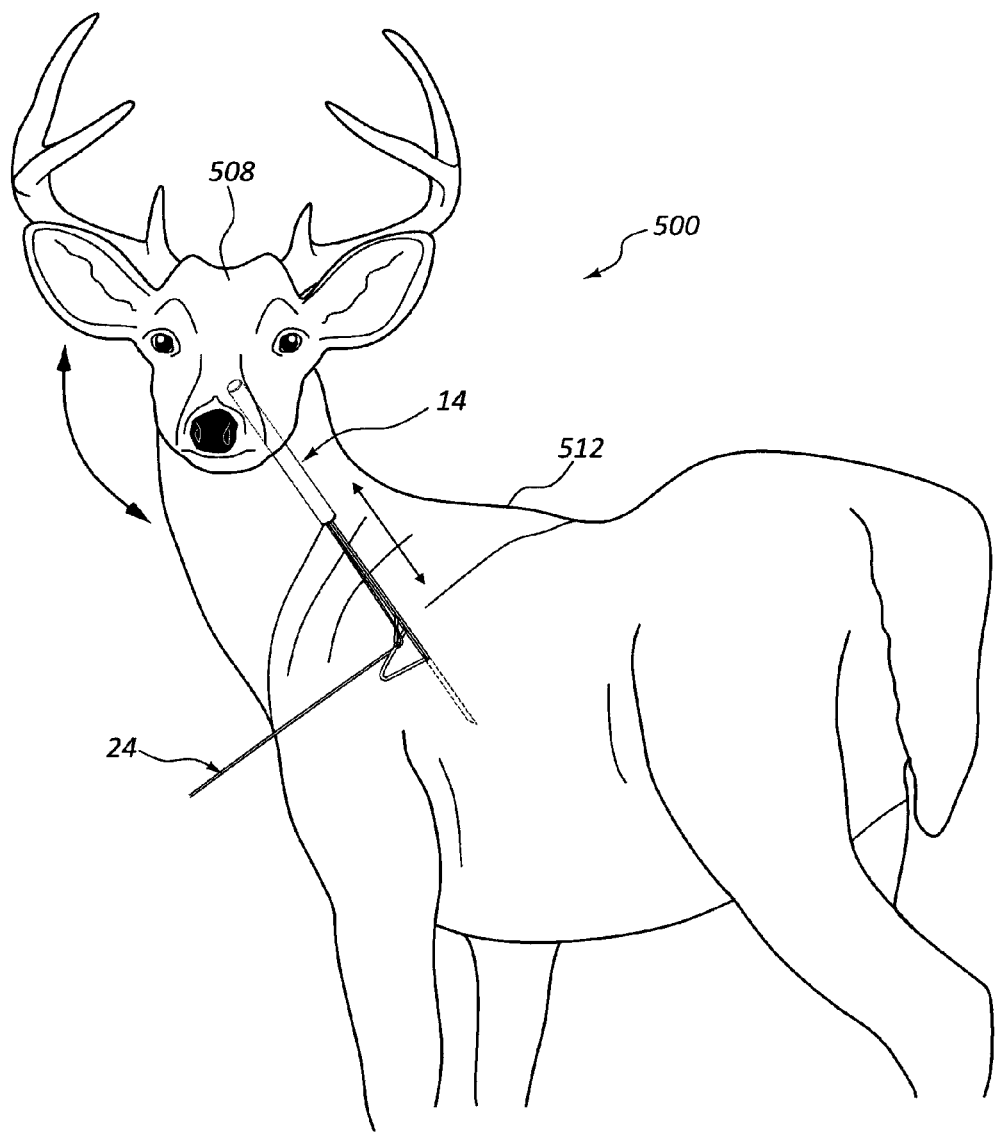
FIG. 13 shows another example game decoy using the lift assembly of FIG. 3 in accordance with the present disclosure.

FIGS. 11-13 show further example game decoys operable with the lift assembly 14 described herein. FIG. 11 shows a game decoy 300 simulating a wild turkey (which could either be a gobbler (a tom or a jake) or a hen) having a decoy body 312 with wings 308. A separate lift assembly 14 is associated with each of the wings 308. The lift assembly 14 may be operated individually or concurrently to move the wings 308 relative to the decoy body 312, giving the game decoy 300 a more realistic appearance than a stationary decoy. The lift assembly 14 may be integrated into the game decoy 300. Alternatively, the lift assembly 14 may be separable from and operable independent of the decoy body 312 and wings 308. In at least some examples, the carrier member 22 may include features that assist in connecting the lift assembly 14 to various portions of a decoy body so that the lift apparatus may be attached at any desired location to move any desired portion of a given decoy body.

FIG. 12 shows another game decoy 400 having a decoy body 412 moveable by operation of a lift assembly 14. The decoy body 412 is in the shape of a rodent such as a squirrel or chipmunk. The lift assembly 14 may move the entire decoy body 412 relative to a ground surface. In some arrangements, the lift assembly 14 may be used to move certain portions of the decoy body 412 such as, for example, hands, feet, ears, or tail of the decoy body 412.

FIG. 13 shows another example game decoy 500 having a decoy body 512 with a head portion 508 moveable by operation of the lift assembly 14. Operating the lift assembly 14 may move the head portion 508 relative to the decoy body 512. In one example, the movement of head portion 508 is rotational relative to remaining portions of decoy body 512. The rotational movement may be side-to-side, up-and-down, or a combination thereof. This rotational movement of the head portion 508 may give the appearance of the large animal game decoy looking in different directions. The lift assembly 14 may be integrated into the decoy body 512 so that the lift assembly 14 is not visible from outside of the decoy body 512. For example, the lift assembly 14 may be positioned within a neck or a hollow internal cavity of the decoy body 512 and only the cord 24 extends outside of the decoy body 512. In other examples, at least portions of the support member 16 and carrier member 22 are positioned outside of the decoy body 512 as shown in FIG. 13.

In other examples, the lift assembly 14 may be used to move other portions of the decoy body 512 such as, for example, a tail, legs, or ears of the large animal decoy.

The support members shown with reference to the attached figures is an elongate structure that is generally linear. In other arrangements, the support member may have a curved or twisted shape that provides a curved or twisted movement of the carrier member during operation that moves the decoy body or portion of the decoy body along a similar curved or twisting path of motion. In one example, the support member has a cross-sectional shape that controls a rotational position of the carrier member as the carrier member moves axially relative to the support member during operation of the lift assembly. The support member may have a helical construction along its length so that the carrier member rotates about the longitudinal axis of the support member as the carrier member moves axially relative to the support member. A decoy body such as the duck-shaped decoy body of FIGS. 1 and 2, which is attached to the carrier member, would then rotate as the decoy body raises and lowers during operation of the lift assembly.

The relatively simply design of the lift assembly described herein, which has a limited number of parts, a simple design, and a low level of complexity required for assembling the parts may provide advantages over other types of moveable game decoys and related mechanisms for providing movement in a game decoy. Some example advantages include reduced costs, ease of repair and replacement of parts, reduced weight, and adaptability for interchanging the lift assembly with various decoy bodies. For example, each of a plurality of different decoy bodies may have a similar bore that is shaped to receive and connect to the carrier member. The lift assembly may be inserted into the bore and removed from the bore as desired when the decoy body is being used in the field, is stored, or is being exchanged for a different decoy body. Further, a given decoy body may have a plurality of different bores arranged at different positions on the decoy body (e.g., at different angles). The lift apparatus may be inserted into any one of the different bores to provide a different orientation or movement of the decoy body upon operation of the lift assembly.

Unless otherwise noted, the terms "a" or "an", as used in the specification and claims, are to be construed as meaning "at least one of." In addition, for ease of use, the words "including" and "having", as used in the specification and claims, are interchangeable with and have the same meaning as the word "comprising."

What is claimed is:

1. A game decoy component, comprising:
a support member having distal and proximal ends;
an anchor connected to the proximal end of the support member;
a bearing member positioned at the distal end of the support member;
a carrier member slidably supported on the support member and configured for attachment to a portion of a game decoy, the distal end of the support member and the bearing member each being positioned within the carrier member;
a flexible member having a first end connected to the carrier member and an opposing second end positioned remote from the carrier member, the flexible member being supported on the bearing member, wherein applying tension in the flexible member moves the carrier member along the support member to move the portion of the game decoy relative to the support member.

2. The game decoy component of claim 1, wherein the flexible member comprises one of an inelastic cord and an elastic cord.

3. The game decoy component of claim 1, wherein the bearing member includes a bearing surface defined by a bore in the bearing member, the bearing surface supporting the flexible member.

4. The game decoy component of claim 3, wherein the bearing surface comprises a pulley.

5. The game decoy component of claim 3, wherein the bearing surface comprises a low friction polymeric material.

6. The game decoy component of claim 1, wherein the carrier member includes first and second end portions, the first end portion being closed and the second end portion including a first opening through which the support member extends and a second opening through which the second end of the flexible member extends.

7. The game decoy component of claim 1, wherein the carrier member further comprises a hollow housing, wherein the distal end of the support member and the bearing member are each positioned within the housing, and applying tension in the flexible member moves the housing axially relative to the support member.

8. The game decoy component of claim 7, wherein the carrier member includes a distal plug positioned in a distal end of the housing and a proximal plug positioned in a proximal end of the housing, the support member and the flexible member extending through the proximal plug.

9. A game decoy component, comprising:
a support member having distal and proximal ends;
an anchor connected to the proximal end of the support member;
a bearing member positioned at the distal end of the support member;
a carrier member slidably supported on the support member and configured for attachment to a portion of a game decoy, the carrier member including first and second end portions, the first end portion being closed and the second end portion including a first opening through which the support member extends and a second opening;
a flexible member having a first end connected to the carrier member and an opposing second end positioned remote from the carrier member, the flexible member being supported on the bearing member, wherein applying tension in the flexible member moves the carrier member along the support member to move the portion of the game decoy relative to the support member, wherein the second end of the flexible member extends through the second opening of the second end portion of the carrier member.

10. A game decoy component, comprising:
a support member having distal and proximal ends;
an anchor connected to the proximal end of the support member;
a bearing member positioned at the distal end of the support member;
a carrier member slidably supported on the support member and configured for attachment to a portion of a game decoy, the carrier member having a hollow housing;
a flexible member having a first end connected to the carrier member and an opposing second end positioned remote from the carrier member, the flexible member being supported on the bearing member, wherein applying tension in the flexible member moves the carrier member along the support member to move the portion of the game decoy relative to the support member,
wherein the distal end of the support member and the bearing member are positioned in the housing, and applying tension in the flexible member moves the housing axially relative to the support member.

11. The game decoy component of claim 10, wherein the carrier member includes a distal plug positioned in a distal end of the housing and a proximal plug positioned in a proximal end of the housing, the support member and the flexible member extending through the proximal plug.

* * * * *